Dec. 8, 1953   H. V. PITTMAN   2,661,708
SOD PLANTING MACHINE
Filed June 12, 1946   2 Sheets-Sheet 1
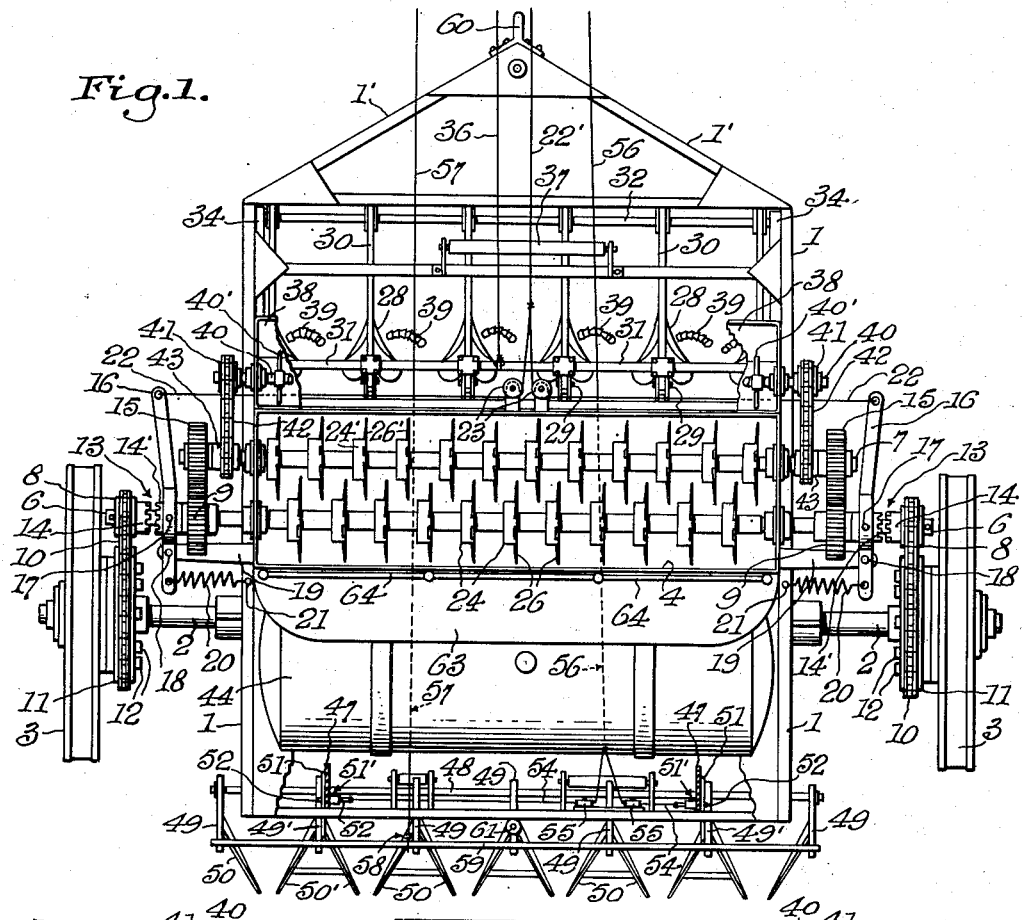
Inventor
Harrison Victor Pittman
By [signatures]
Attorneys Dec. 8, 1953 H. V. PITTMAN 2,661,708
SOD PLANTING MACHINE
Filed June 12, 1946 2 Sheets-Sheet 2

Inventor
Harrison Victor Pittman

By
Attorneys

Patented Dec. 8, 1953

2,661,708

UNITED STATES PATENT OFFICE 2,661,708

SOD PLANTING MACHINE

Harrison V. Pittman, Little Rock, Ark.

Application June 12, 1946, Serial No. 676,130

2 Claims. (Cl. 111—1)

(Granted under Title 35, U. S. Code (1952), sec. 266)

The invention described herein may be manufactured and used by or for the Government for governmental purposes, without payment to me of any royalty thereon.

This invention relates generally to planters and more particularly to sod planters used in connection with a tractor.

One of the objects of the invention is to provide means for planting living pieces of sod in such a manner as to insure its continued growth when applied to levees, airports, and other projects requiring permanent grass-covered surfaces.

Another object of this invention is to provide a sod planting machine embodying means for applying fertilizer to the earth when necessary or required, plowing means for producing furrows in the earth, means for cutting sod into pieces and distributing the cut pieces of sod into the plowed furrows, means for applying water directly to the sod pieces in the open furrows, means for covering the sod with the earth displaced by the plowing means in producing the furrows, and means for compacting the furrows of planted and watered sod pieces all of which are combined into a compact unit, tractor-drawn and operated by the driver from his seat on the tractor.

Further objects of the invention are to provide a sod planting machine which is comparatively durable, thoroughly efficient and convenient in its use, readily assembled and well adapted for the purpose intended.

With the above and other objects and advantages in view, the invention consists of certain features of construction, combination and arrangement of parts, which will hereinafter be described and illustrated in the accompanying drawings, in which:

Fig. 1 is a top plan view of the sod planting machine embodying the invention, removable soil-compacting means employable with the machine being not shown;

Fig. 2 is a vertical transverse sectional view taken from the rear of the machine;

Figure 3:
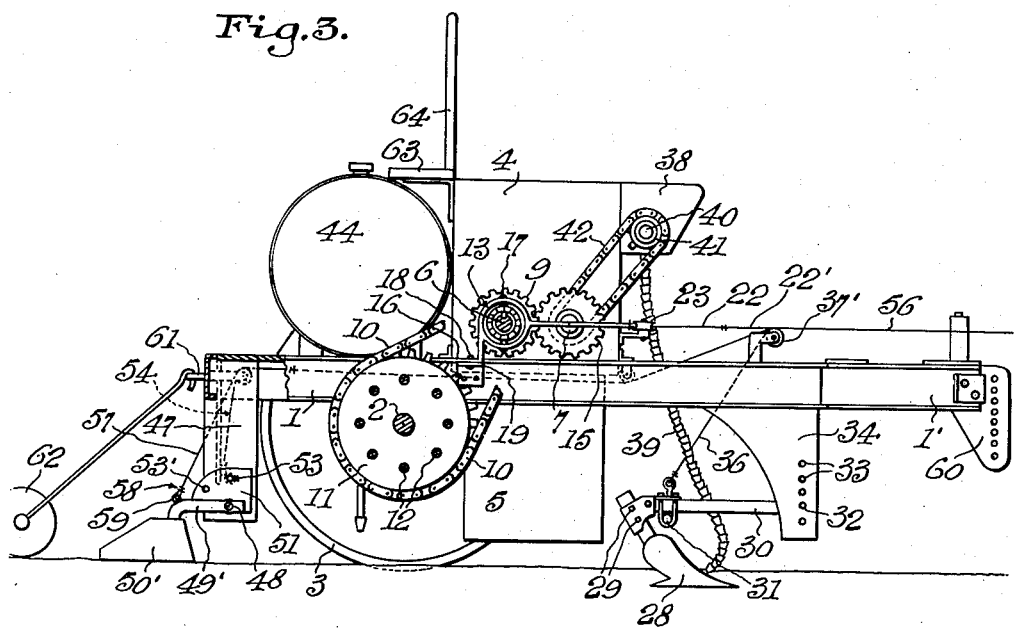
Fig. 3 is a side elevation of the machine, with a wheel of the machine removed therefrom, the view including soil-compacting means removably attached to the machine and operative therewith.

Referring more specifically to the drawings, a substantially rectangular frame 1 of the sod planting machine is supported on a transversely extending axle 2 having the main drive or travel wheels 3 mounted on opposite ends thereof. The wheels 3 are preferably made of steel as illustrated, but may be single or dual rubber tired.

A transversely extending hopper 4 for sod having a plurality of spaced sod chutes 5 extending vertically downward therefrom is mounted on the frame 1 substantially at the middle thereof, with bracing members 5' between the sod chutes 5 at their lower ends. The sod hopper 4 has a transversely extending rear cutter shaft 6 and a front cutter shaft 7 parallel thereto, with the ends of the shafts 6 and 7 extending through the sides of the sod hopper 4 and rotatably mounted in bearings. The ends of the rear cutter shaft 6 have sprockets 8 and spur gears 9 mounted thereon, with the sprockets 8 being loosely mounted on the rear cutter shaft 6 and driven by chains 10, which in turn are driven by main drive sprockets 11 mounted on the inner faces or hubs of the wheels 3 by bolts 12. Clutches 13 are provided, having one of their sides 14 formed on one of the sides of the loosely or rotatably mounted sprockets 8 and their other sides 14' keyed to and slidably mounted on the rear cutter shaft 6. The spur gears 9 are keyed to the rear cutter shaft 6 and mesh with spur gears 15 keyed to the outer ends of the front cutter shaft 7.

Figure 4:
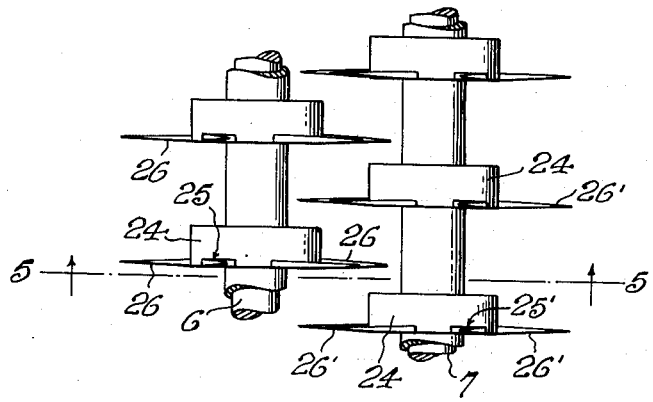
Fig. 4 is an enlarged fragmentary detail plan view illustrating the arrangement of rear and front shafts including hubs of the machine with cutter knives removably mounted on the hubs.
Figure 5:
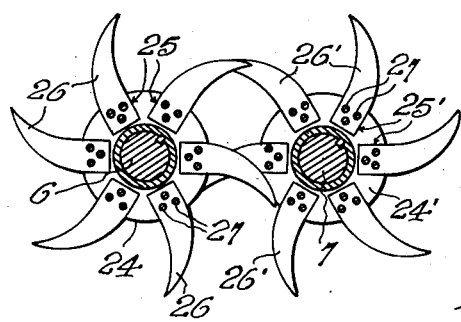
Fig. 5 is a cross-sectional view taken on line 5—5 of Fig. 4.

Levers 16 are pivotally connected at 17 to the slidable sides 14' of clutches 13 and pivotally connected at 18 to the outer ends of outwardly extending arms 19 mounted at their inner ends to the sides of the sod hopper 4. Contractable springs 20 are connected at one of their ends to the lower ends of the levers 16 and at their other ends to the frame 1 at 21 to operate the levers 16 about their pivots for actuating the sides 14' of the clutches 13 into engagement with the other sides 14 thereof. Cables 22 are attached at one of their ends to the upper ends of the levers 16, said cables 22 engaging pulleys 23 and extending toward the middle of the machine, where they are joined together at their other ends to a single cable 22' which may lead to a tractor (not shown) for advancing the machine along an area to be planted with sod, where the cable 22' may be pulled by the operator of the tractor for disengaging the clutches 13. The rear and front cutter shafts 6 and 7 are equipped with suitable spaced knife hubs 24 and 24', respectively, having side recesses 25 and 25', with outwardly curved cutter knives 26 and 26' detachably mounted in the recesses by bolts 27 as illustrated more particularly in Figs. 4 and 5. The cutter knives 26 and 26' are spaced on the rear and front cutter shafts 6 and 7, respectively, in such a maner as to cause the cutter knives 26 to be actuated between the cutter knives 26'.

In front of the sod hopper 4 are a plurality of plows 28 shown in Figs. 1 and 3, which plows 28 are illustrated as being of the dual mold board type, but may be of any other suitable type, such as the double shovel type. The upper ends of the plows 28 are connected by means of bolts 29 to the inner ends of arms 30, which in turn are mounted on a transversely extending rod 31, with the outer ends of the arms 30 being pivotally mounted on a rod 32 having its ends removably mounted in certain of a plurality of vertically spaced holes 33 formed in depending side plates 34 on the frame 1 as shown in Fig. 3, whereby the plows 28 may be adjusted to various depths for plowing furrows 35, Fig. 2. The plow assembly is operated as a unit, which is raised and lowered by means of a cable 36 connected at one end to the plow assembly and engaging a pulley 37 from where it may lead to the tractor for pulling the machine, with the cable 36 adapted to be manipulated by the driver of the tractor.

A hopper 38 for fertilizer is mounted on the upper front side of the sod hopper 4, with flexible tubes 39, extending downwardly from the bottom of the fertilizer hopper to the front of the plows 28. A transversely extending shaft 40 having spaced agitator elements 40' mounted thereon is provided in the fertilizer hopper 38, with the ends of the shaft 40 rotatably mounted in the sides thereof. The ends of shaft 40 extend through the sides of the hopper 38 and have sprockets 41 keyed thereto, which are driven through sprocket chains 42, driven by sprockets 43 mounted on the front cutter shaft 7.

A water tank 44 which is installed in the rear of the sod hopper 4 is equipped with a main distributor pipe 45 to which one of the ends of spaced smaller pipes or tubes 46 are attached, with the other ends of tubes 46 extending downwardly from the main distributor pipe 45, whereby water may be applied in the open furrows 35 made by the plows 28.

On the rear of the sod planting machine is a pair of downwardly extending supporting brackets 47, which are connected at their upper ends to the frame 1 and have a transversely extending rod 48 mounted thereon, with the inner ends of beams 49 and 49' of a plurality of spaced sod cover plates or shoes 50 and 50' pivotally mounted on the rod 48. The beams 49' of the cover shoes 50' have arcuate plates 51 mounted thereon. The supporting brackets 47 are each provided with a latch 51' with the inner ends of the movable bolts 52 thereof engaging in holes 53 and 53' formed in the arcuate plates 51, depending upon the downward or upward position of the cover shoes. These latches 51' are provided for holding the shoes 50 and 50' in a downward or upward position and are actuated by means of cables 54 connected at one of their ends to the bolts 52. The cables 54 extend across the frame 1 and engage pulleys 55 where they are connected at their other ends to a single cable 56 leading to the tractor and manipulated by the driver of the tractor for engaging and disengaging the latches 51' from the arcuate plates 51. The cover shoes 50 and 50' are operated as a unit and are raised and lowered by means of a cable 57 connected by one end at 58 to a rod 59 which is welded or otherwise attached to the beams 49 and 49' of the cover shoes. The cable 57 extends from the rod 59 to the tractor, where it is operated by the driver of the tractor.

The front end 1' of the frame 1 is substantially triangular and may be provided with any suitable clevis 60 thereon for hitching a tractor thereto, and the rear end of the frame 1 is provided with a connecting member 61 to which a roller 62 may be hitched for compacting the soil after pieces of sod have been planted in the furrows 35. A wooden platform 63, Fig. 3, having a guard rail 64 thereon is provided on the sod planting machine for use of an attendant thereof.

In operation of the improved machine for planting pieces of living sod, preferably Bermuda sod, to insure its continued growth when applied to levees, airports, and other projects requiring permanent grass-covered surfaces, the sod hopper 4 is filled with sod and the furrowing plows 28 on the front of the machine are lowered as a unit to the earth through the medium of the cable 36 operated by the driver of the tractor used in advancing the sod planting machine over an area to be covered.

The cover shoes 50 and 50' on the rear of the machine are then lowered by means of the cable 57 by the tractor driver until the movable bolts 52 of the latches 51' register with the holes 53 in the arcuate plates 51, whereupon the bolts 52 are caused to enter the holes 53 for holding the cover shoes in position on the surface of the earth. On advancing the machine by the tractor, the furrowing plows 28 will act to form furrows 35 in the earth in the usual manner, Fig. 2. As the wheels 3 of the machine are rotated in a clockwise direction as indicated by the arrow, the main sprockets 11 on the axle of the wheels and the chains 10 will be rotated in the same direction, which will in turn rotate the loosely mounted sprockets 8 on the outer ends of the rear cutter shaft 6 of the sod hopper 4 and the sides 14 of clutches 13 mounted on the loosely mounted sprockets 8 will also be rotated in this direction.

Upon the tractor operator releasing the cable 22', the springs 20 pull on the lower ends of the levers 16 moving them about their pivots 18 and moving the sides 14' of the clutches 13 outwardly on the rear cutter shaft 6 until they engage with their sides 14, whereupon the rear cutter shaft 6 is rotated toward the side of the sod hopper 4 at the front end of the machine. As the rear cutter shaft 6 is rotated, the front cutter shaft 7 and the sod cutter blades 26' thereon are rotated toward the side of the sod box at the rear of the machine by means of the spur gears 9 on the rear cutter shaft 6 meshing with the spur gears 15 on the front cutter shaft 7, whereby the sod in the hopper 4 is cut into pieces of suitable size which fall through the chutes 5 on the bottom of the sod hopper 4 from where they are distributed into the furrows 35 produced by the plows 28.

Upon the front cutter shaft 7 being rotated, the sprockets 43 mounted thereon are rotated, which in turn drives the chains 42, which rotates the sprockets 41 on shaft 40 rotatably mounted in the fertilizer hopper 38. The shaft 40 being rotated causes the agitator elements 40' thereon to stir up the fertilizer in the hopper 38, which stirred up fertilizer is caused to pass through the tubes 39 and to be applied to the earth in front of the plows 28.

The water in the tank 44 at the rear of the sod hopper 4 is caused to enter the main distributor pipe 45 and to leave out of the lower ends of the smaller pipes 46, where the water is applied directly to the cut-up sod pieces in the furrows 35. After the water has been applied to the sod pieces, the cover shoes 50 and 50' on the rear of the machine cover the pieces of sod with earth displaced by the plows 28 in producing the furrows as the machine advances and after the pieces of sod have been covered with the earth the roller 62 on the connecting member 61 compacts the furrows 35 of planted sod pieces.

When it is desired to position the plows 28 out of operative relation with the ground, they are raised as a unit by means of the cable 36 by the operator of the tractor. To raise the cover shoes 50 and 50' out of operative relation with the ground, the single cable 56 is pulled by the tractor driver and the cables 54 are actuated about the pulleys 55 to disengage the bolts 52 on the latches 51' from the holes 53 formed in the arcuate plates 51, whereupon by pulling on the cable 57, the cover shoes 50 and 50' may be raised as a unit until the holes 53' in the plates 51 are engaged by the bolts 52 of the latches 51' thus holding the cover shoe assembly in a raised position. Upon pulling on the cable 22', the cables 22 are actuated about the pulleys and pull on the upper ends of the levers 16 which actuates the levers about their pivots 18 against the action of the springs 20 and disengages the clutches 13 which stops the operation of the machine.

All bearings may be equipped with self-closing grease and oil cups (not shown) and sealed against the entrance of dirt or other injurious foreign matter. Guards also (not shown) may be provided for all chains, sprockets and gears.

It will thus be seen that there is here provided a novel and efficient form of sod planting machine, which is well adapted for the purposes intended. Even though there has herein been provided a machine having certain features of construction and operation of parts, it is nevertheless to be understood that various changes may be made therein if the changes do not depart from the spirit or scope of the claims.

Having thus described my invention, what I claim as new and wish to secure by Letters Patent is:

1. A sod-planting machine comprising, in combination, a portable frame, traction wheels supporting the frame, transversely-aligned equally-spaced double mold board plowing means mounted on the frame for plowing parallel furrows in terrain over which the machine is being moved and forming ridges of earth between the furrows, a hopper mounted on the frame rearwardly of the plowing means for receiving massive units of sod, equally spaced sod-comminuting cutting means mounted in the hopper for comminuting the massive units of sod into small pieces, said cutting means being mounted on oppositely rotatable parallel shafts and in staggered relation, said shafts being in a substantially horizontal plane, mechanism operable responsively to rotation of the traction wheels for rotating said shafts as the machine is moved along the terrain being planted, sod-distributing members secured to said hopper in alignment with the plowing means and receiving from the sod-cutting means small pieces of sod and distributing said small pieces into the furrows, the distributing members having discharge openings larger in area than the spacing between adjacent staggered cutting means, watering means mounted on and disposed rearwardly of the hopper and directly above the furrows for applying water to the pieces of distributed sod, covering means disposed rearwardly of the watering means for entering said ridges of earth, said covering means including laterally acting spreading plates entering said ridges of earth and laterally spreading the earth therefrom around the comminuted pieces of sod in the furrows for enclosing said pieces and filling interstitial portions of the furrows between the pieces with earth, means for vertically adjusting the plowing means for plowing furrows in accordance with size of the comminuted pieces of sod commensurate in depth and width to the size of the pieces of sod being deposited in the furrows, and mechanism for selectively controlling the aforementioned means from a single operating station.

2. A sod-planting machine comprising, in combination, oppositely spaced traction wheels, a machine frame carried by the traction wheels, a hopper mounted on said frame having an open bottom and adapted to receive massive units of sod, uniformly spaced discharge chutes attached to said hopper adjacent to the bottom thereof and having inlets registering with the interior of said hopper, spaced parallel cutter shafts mounted in a substantially horizontal plane in the hopper adjacent to the bottom thereof, means for effecting rotation of the shafts in opposite directions, a plurality of detachable hubs carried by the shafts and arranged in mutually spaced parallel relation lengthwise of the shafts, a plurality of arcuate cutter bars detachably mounted on said hubs and extending generally radially therefrom, the hubs and arcuate cutter bars being arranged on the shafts in relatively alternating staggered relation for rotation in opposite and overlapping relation for dividing massive units of sod deposited in said hopper into small units of sod to be planted, a plurality of transversely aligned adjustable plowing blades mounted transversely on the frame in advance of the hopper for plowing parallel furrows in terrain being sodded and forming ridges of earth between the furrows, means for vertically adjusting the plowing blades commensurately with the size of the units of sod being planted, said discharge chutes having discharge openings aligned with the plowing blades for delivering comminuted small pieces of sod into the furrows, said discharge openings having areas greater than the distance between adjacent staggered cutter bars, fertilizer-distributor means mounted on the frame parallel with and intermediate the plowing blades and the hopper for depositing fertilizer into the furrows, agitator means located in the fertilizer-distributor means, watering means mounted on the frame rearwardly of the hopper and directly above and adjacent to the parallel furrows, adjustable covering means mounted on the frame rearwardly of the watering means, said covering means including pairs of plates, the plates of each pair diverging rearwardly of the frame from a forwardly directed apex secured to said frame, said pairs of plates being equidistantly offset with respect to longitudinal center lines through the plowing blades for enabling the plates to enter the ridges of earth between the furrows for laterally distributing the earth from the ridges uniformly about the small pieces of sod deposited in the furrows, means for adjusting said covering plates in conformity with adjustment of the plowing blades; means carried by the frame and operable responsively to turning of the traction wheels for rotating the parallel cutter shafts in the hopper and the agitator means in the fertilizer distributor means, compacting means attached to the frame rearwardly of the earth-spreading means for compacting and substantially leveling the planted pieces of sod and their surrounding earth; and means for selectively controlling from a single operating station the plowing blades, the covering means, the cutter shafts, the agitator means, and the watering means; whereby, upon forward motion of the frame, parallel furrows are plowed by the plowing blades commensurate with the size of the pieces of sod being deposited in the furrows by the discharge chutes; which pieces of sod are fertilized, moistened, uniformly surrounded with previously furrowed earth, and compacted into substantially level condition.

HARRISON V. PITTMAN.

References Cited in the file of this patent

UNITED STATES PATENTS

| Number | Name | Date |
|---|---|---|
| 261,627 | Philpot | July 25, 1882 |
| 385,234 | Bon | June 26, 1888 |
| 413,124 | Brandenburg et al. | Oct. 15, 1889 |
| 423,200 | Alward | Mar. 11, 1890 |
| 426,455 | Leonard et al. | Apr. 29, 1890 |
| 447,763 | Coombs | Mar. 10, 1891 |
| 467,683 | Essex | Jan. 26, 1892 |
| 474,425 | Updike | May 10, 1892 |
| 499,535 | Genevois | June 13, 1893 |
| 520,477 | Bemis | May 29, 1894 |
| 581,966 | Todd | May 4, 1897 |
| 746,654 | Adair | Dec. 15, 1903 |
| 791,465 | Henderson | June 6, 1905 |
| 871,328 | Downs | Nov. 19, 1907 |
| 963,249 | Reveley | July 5, 1910 |
| 1,021,929 | Hovey | Apr. 2, 1912 |
| 1,175,544 | Moore | Mar. 14, 1916 |
| 1,226,515 | Hicks | May 15, 1917 |
| 1,231,353 | Hicks | June 26, 1917 |
| 1,374,149 | Huelves | Apr. 5, 1921 |
| 1,392,054 | Herron | Sept. 27, 1921 |
| 1,413,353 | Phillips | Apr. 18, 1922 |
| 1,471,179 | Marotz | Oct. 19, 1923 |
| 1,517,715 | DeGeus | Dec. 2, 1924 |
| 1,532,884 | Chapin | Apr. 7, 1925 |
| 1,536,508 | Lilja | May 5, 1925 |
| 1,592,250 | Yerkes | July 13, 1926 |
| 1,829,745 | Grossi | Nov. 3, 1931 |
| 1,908,548 | Smith | May 9, 1933 |
| 2,128,860 | Stevens | Aug. 30, 1938 |
| 2,164,639 | Brower | July 4, 1939 |
| 2,235,950 | St. John | Mar. 25, 1941 |
| 2,330,304 | Mott | Sept. 28, 1943 |
| 2,386,192 | Brimhall | Oct. 9, 1945 |
| 2,484,800 | Acton | Oct. 18, 1949 |

FOREIGN PATENTS

| Number | Country | Date |
|---|---|---|
| 100,757 | Australia | Apr. 8, 1937 |
| 200,858 | Great Britain | July 23, 1923 |
| 254,995 | Germany | Dec. 21, 1912 |
| 559,212 | Great Britain | Feb. 9, 1944 |